3,042,506
FUEL COMPOSITIONS

Eldon B. Cole, Tulsa, and Phillip M. Niles, Sand Springs, Okla., assignors to Sinclair Refining Company, New York, N.Y., a corporation of Maine
No Drawing. Filed Dec. 22, 1958, Ser. No. 781,890
13 Claims. (Cl. 44—62)

The present invention relates to fuel oil compositions stabilized against the harmful effects of oxidation or deterioration. More particularly the invention is concerned with distillate fuel oils containing certain additives adapted to stabilize the fuel oils against oxidative deterioration during storage or use.

Hydrocarbon fuels, for example, those distilling primarily in the range from about 300 to 750° F., tend to deteriorate and form sediment, insoluble gum, etc. which if not removed, plug filter screens, orifices and other parts of equipment used in burning the oils. The formation of sediment, insoluble gum, etc. in these oils is attributable primarily to the oxidation of unstable constituents contained in the oils. This oxidation takes place under prolonged storage at atmospheric temperatures as well as under elevated temperatures during use.

It has now been found that the oil-compatible, i.e. soluble, miscible or dispersible oxyalkylated reaction product of a lower aliphatic aldehyde and certain fatty diamines when added in relatively small amounts to distillate fuel oils effectively stabilize the oil against deterioration. The oxyalkylated reaction products of the present invention are prepared by reacting about one mole equivalent of a lower aliphatic aldehyde with about .5 to 2 moles equivalent of the fatty diamine preferably about 1 mole of aldehyde to 1 mole of fatty diamine and then oxyalkylating the resulting product with a $C_2$–$C_4$ alkylene oxide or mixtures thereof. The reaction of the aldehyde and fatty diamine is carried out at temperatures high enough to remove water but not so high as to degrade the product and is continued at least until the aldehyde-diamine reaction product is substantially completely dehydrated; generally about 175° F. to 400° F., preferably about 190 to 325° F.

The fatty diamine contemplated by the present invention has the structural formula:

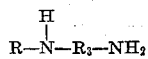

in which R is an aliphatic hydrocarbon chain of at least about 6 and preferably about 12 to 22 carbon atoms and $R_3$ is a divalent aliphatic hydrocarbon radical containing about 2 to 8 carbon atoms. The hydrocarbon radicals can be straight or branched chain and substituted or unsubstituted. Preferably, $R_3$ is a polymethylene group of about 2 to 8 carbon atoms and advantageously about 2 to 4 carbon atoms. These diamines can be prepared by a variety of well-known procedures, as for example, by reacting an aliphatic chloride containing the desired number of carbon atoms with a polymethylene diamine which contains from 2 to 8 methylene groups. The aliphatic R group which is attached to the nitrogen atom is either saturated or unsaturated and is preferably an alkyl or alkylene residue radical obtained from fatty acids. Fatty acids which are suitable for providing residues containing the desired number of carbon atoms can be obtained from fats and oils such as soybean oil, lard oil, castor oil, corn oil, tallow, coconut oil, etc. or from resin acids such as those derived from tall oil which contains a mixture of fatty acids and resin acids.

An example of a preferred fatty amine used in the preparation of the oxyalkylated reaction products of this invention is a diamine designated as "Duomeen T" in which $R_3$ in the above formula is trimethylene and R is the straight chain hydrocarbon residue derived from tallow fatty acids containing 16 to 18 carbon atoms, both saturated and unsaturated. Similar fatty diamines can be used in which the hydrocarbon group is derived from monobasic acids such as, for example, lauric acid, myristic acid, palmitic acid, stearic acid, margaric acid, oleic acid, ricinoleic acid, linoleic acid, etc., as well as monobasic acids derived by oxidation of petroleum waxes.

The aldehydes useful in preparing the condensation products of the present invention are the lower aliphatic aldehydes representative of which are formaldehyde and butyraldehyde. Included within the formaldehydes are the polymers of formaldehyde, such as paraformaldehyde which yield formaldehyde during the reaction.

In the oxyalkylation reaction of the present invention about 5 to 80 weight percent, preferably about 10 to 50 weight percent of a $C_2$–$C_4$ alkylene oxide, for instance, ethylene oxide and propylene oxide or mixtures thereof are reacted with about 20 to 95 weight percent, preferably about 50 to 90 weight percent of the fatty diamine-aldehyde reaction product. These percentages are based on the total amount of diamine-aldehyde reaction product and alkylene oxide. The amount of alkylene oxide employed can be varied to obtain a product of maximum efficiency for the particular fuel oil utilized. Mixtures of alkylene oxides, as aforementioned, can also be employed and in fact have been found to improve the solubility characteristics of the finished product. If utilized mixtures of ethylene oxide and propylene oxide are preferred generally in a ratio of about .5 to 5 parts ethylene oxide to 1 part propylene oxide.

The oxyalkylation reaction can in general be conducted at a temperature of about 250° F. to 400° F., preferably about 300° F. to 375° F. and, if desired, in the presence of an oxyalkylation catalyst in catalytic amounts. Examples of suitable oxyalkylation catalysts that may be employed are sodium methylate, sulfuric acid, sulfonic acids, etc.

Prior to oxyalkylation, it is generally found desirable to dissolve the fatty diamine-aldehyde reaction product of the present invention in an aromatic hydrocarbon solvent such as xylene. Upon completion of the oxyalkylation the solvent can be removed and the finished product added as such to the fuel oils of the present invention or it can be added in its diluted form. In the latter case, the oxyalkylated base will generally range from about 45 to 85 percent by weight depending upon the amount of solvent employed. If desired, the oxyalkylated base-xylene product can be further diluted, as for example, to where it has a 50% or less of active ingredient.

The fuel oils which are improved in accordance with this invention are hydrocarbon fractions boiling primarily in the range from about 300°–750° F. Such fuel oils are generally known as distillate fuel oils. It must be understood, however, that this term is not restricted to straight-run distillates. These fuels can be straight-run distillate fuel oils, catalytically or thermally cracked distillate fuel oils or mixtures of straight-run distillate fuel oils, naphthas and the like, with cracked distillate stocks. The cracked materials will frequently be about 15 to 70 volume percent of the fuel. Moreover, such fuel oils can be treated in accordance with well known commercial methods, such as, acid or caustic treatment, solvent refining, clay treatment, etc.

In order to effectively stabilize the distillate fuel oils the condensation products of the present invention are added to the fuel oils in concentrations varying between about 5 pounds per thousand barrels of oil and about 250 pounds per thousand barrels of oil. Preferably the concentration varies between about 5 and 50 pounds per thousand barrels of oil.

Metal deactivators in relatively small amounts, i.e. up to about 2 pounds/1000 barrels of fuel oil, preferably about .5 to 1 pound per 1000 barrels of fuel oil, can be added along with the additives of the present invention to enhance the latter's stabilizing effect on the fuel oils. Examples of suitable metal deactivators are N,N'-disalicylidene 1,2-propylene diamine, dimethyldithio oxamide, condensation products of o-hydroxy aromatic aldehyde or o-hydroxy aromatic ketone and an aliphatic polyamine as disclosed by Downing et al. in Patents Nos. 2,181,126, 2,255,597 and 2,301,861. If desired, the fuel oil compositions of the present invention can contain other additives for the purpose of achieving other results. Thus, for example, there can be present foam inhibitors, anti-rust agents, and ignition and burning quality improvers.

The tests used to determine the stability of the fuel oil compositions of the present invention were the 100° F. cabinet storage test and the high temperature stability test. In the 100° F. cabinet storage test 400 milliliter samples of the fuel oil composition are placed in a cabinet maintained at 100° F., for periods of 2, 4 and 6 months. At the end of the test periods the sample is removed from the cabinet and cooled. The cooled sample is filtered to remove the insoluble matter. The weight of such matter in milligrams is reported as the amount of deposit or sediment per 100 milliliters.

In the high temperature stability test, samples of the fuel oil compositions are passed through a filter disc immediately after preparation ("0 week storage"), and again after storage in cans at room temperature ("12 weeks storage"). In addition, the fuel composiitons are similarly tested without heating to show deterioration at room temperature ("before heating"), and in the regular high temperature test at 300° F. for 90 minutes ("after heating"). The color of the filtered oil is recorded and the condition of each filter disc after the test is given a numerical scale rating, 0 representing no staining and 5 representing heavy staining and deposits.

The following examples will serve to illustrate the compositions of the present invention but are not to be considered limiting.

EXAMPLE I 500 grams of Duomeen T, 41 grams of commercial paraformaldehyde, 300 grams of xylene and 50 grams of water were charged to a flask equipped with agitator, condenser, water trap and heating mantle. The mixture was heated with constant agitation to about 200° F. When the xylene-water mixture started to reflux a temperature sufficient to keep the reflux going was maintained and after 5½ hours a total of 82 grams of water was removed from the water trap. As no further water was released the reaction was assumed to be complete and a product containing 63 percent active ingredient in xylene dilution was obtained and designated 1089.

One portion of the solution was then oxyalkylated with 10% by weight of mixture of ethylene oxide (8% by weight) and propylene oxide (2% by weight) using sodium methylate in catalytic amounts at a reaction temperature of 340 to 350° F. This yielded 65.0% by weight of oxyalkylated reaction product in dilution with 35% by weight of xylene. The oxyalkylated reaction product was further diluted to 50% active ingredient content and designated as SS 1093A.

Another portion of the fatty diamine-aldehyde solution was oxyalkylated under similar conditions with 30% by weight of mixture of ethylene oxide (24% by weight) and of propylene oxide (6% by weight). This yielded 70.5% by weight of oxyalkylated reaction product in dilution with 29.5% by weight of xylene. Again, the oxyalkylated base was further diluted with xylene to 50% active ingredient and designated SS 1093 C.

EXAMPLE II 200 grams of Duomeen T, 165 grams of 37% formaldehyde and 200 grams of xylene were charged to a flask equipped with agitator, condenser, water trap, and heating mantle. The mixture was heated with constant agitation to about 200° F. When the mixture started to reflux a temperature sufficient to keep the reflux going was maintained and after 5½ hours when no further water was released the reaction was assumed to be complete. The reaction product in xylene dilution (designated 1028) was then oxyalkylated with 60% by weight of ethylene oxide using sodium methylate in catalytic amounts at a reaction temperature of 355 to 365° F. This yielded 72.3% by weight of oxyalkylated reaction product in dilution with 27.7% of xylene. The oxyalkylated reaction product was further diluted to 50% active ingredient content and designated SS 1033 C.

The oxyalkylated reaction products of Examples I and II were added in various concentrations to a distillate fuel oil composed of 50 volume percent water white distillate having an end point of 565 and 50 volume percent fluid light cycle oil derived by catalytic cracking of gas oil. The physical properties of the fuel oil and its constituents are shown in Table I.

Table I

TESTS ON NEAT FUEL

| Composition: | |
|---|---|
| 565 E.P. water white distillate | 50 |
| Fluid light cycle oil | 50 |
| Physical tests: | |
| Gravity, ° API | 34.4 |
| Flash, ° F. | 170 |
| Cloud point, ° F. | −18 |
| Pour point, ° F. | −30 |
| Distillation (200 ml.): | |
| IPB ° F. | 354 |
| 5% | 419 |
| 10 | 442 |
| 20 | 456 |
| 30 | 464 |
| 40 | 472 |
| 50 | 480 |
| 60 | 488 |
| 70 | 498 |
| 80 | 508 |
| 90 | 524 |
| 95 | 536 |
| EP | 563 |
| Recovery percent | 99.5 |
| Residue | 0.5 |

The fuel compositions thus prepared were subjected to the 100° F. cabinet storage test for periods of two and four months, respectively, to determine the effect of the additive contained therein for stabilizing heating oil fuels. The compositions were also subjected to the high temperature stability test to determine the effectiveness of the additives as stabilizers for diesel fuels. The neat fuel was similarly tested for purposes of comparison. The tests results are shown in Table II.

general enhancement of the additives as a fuel oil stabilizer by the incorporation of a metal deactivator. Thus, the results of the 100° F. cabinet storage test particularly illustrate the effectiveness of the additives of the present invention as stabilizers for home heating oils.

Examination of the results of the high temperature stability tests shows that the additives of the present in-

*Table II*

| Additive | Dosage #/MB | MDA #/MB | 100° F. cabinet storage test ||||||
|---|---|---|---|---|---|---|---|---|
| | | | Two months ||| Four months |||
| | | | Deposits mgs./100 ml. | Color NPA | Visual inspection for precipitate in storage tube | Deposits mgs./100 ml. | Color NPA | Visual inspection for precipitate in storage tube |
| Neat fuel | | | 2.2 | 3− | Heavy | 3.4 | 3 | Heavy. |
| SS 1033C (1028 [1]+60% ethylene oxide) | 30 | | 0.9 | 3½− | Trace | 1.5 | 3½− | Trace. |
| SS 1093A (1089 [2]+10% ethylene+propylene oxide) | 20 | | 0.4 | 3 | None | 0.6 | 3½− | None. |
| SS 1093C (1089 [2]+30% ethylene+propylene oxide) | 20 | | 1.0 | 3− | ___do___ | 0.8 | 3½− | Do. |
| SS 1033C | 60 | | 1.2 | 3+ | Trace | 1.6 | 3½− | Trace. |
| SS 1093A | 40 | | 0.7 | 3+ | None | 0.6 | 3½− | None. |
| SS 1093C | 40 | | 0.6 | 3 | ___do___ | 1.0 | 3½− | Do. |
| SS 1033C | 30 | 1 | 0.5 | 3− | Trace | 0.7 | 3+ | Trace. |
| SS 1093A | 20 | 1 | 0.6 | 3− | None | 0.3 | 3½− | None. |
| SS 1093C | 20 | 1 | 0.9 | 3 | ___do___ | 0.7 | 3½− | Do. |

HIGH TEMPERATURE STABILITY TEST

| Additive | MDA #/MB | 0 weeks storage |||||| 12 weeks storage ||||||
|---|---|---|---|---|---|---|---|---|---|---|---|---|---|
| | | Before heating ||| After heating ||| Before heating ||| After heating |||
| | | Filter disc [3] | Color || Filter disc [3] | Color || Filter disc [3] | Color || Filter disc [3] | Color ||
| | | | NPA | OD | | NPA | OD | | NPA | OD | | NPA | OD |
| Neat fuel | | 2 | 2+ | 11 | 4 | 4+ | 86 | 3 | 2− | 19 | 4 | 4½ | 100 |
| SS 1033C | | 0 | 2 | 9 | 4 | 4− | 57 | 1 | 3− | 18 | 5 | 4½− | 82 |
| SS 1093A | | 0 | 2− | 9 | 3 | 4− | 58 | 0 | 3− | 18 | 5 | 4½+ | 84 |
| SS 1093C | | 0 | 2 | 9 | 3 | 4½ | 78 | 0 | 3− | 18 | 5 | 4½+ | 95 |
| SS 1033C | | 1 | 2 | 9 | 2 | 4− | 46 | 2 | 2½+ | 17 | 3 | 4½− | 60 |
| SS 1093A | | 0 | 2− | 9 | 2 | 3½− | 42 | 0 | 3− | 19 | 5 | 4½− | 64 |
| SS 1093C | | 0 | 2− | 9 | 3 | 4½− | 70 | 0 | 3− | 18 | 3 | 4½+ | 90 |
| SS 1033C | 1 | 0 | 2− | 8 | 1 | 2½− | 15 | 1 | 3− | 20 | 4 | 4− | 59 |
| SS 1093A | 1 | 0 | 2− | 9 | 0 | 2½ | 16 | 1 | 3 | 22 | 3 | 4+ | 58 |
| SS 1093C | 1 | 0 | 2− | 9 | 0 | 2½+ | 17 | 1 | 3− | 23 | 3 | 4 | 50 |

[1] 1028—Fatty diamine-aldehyde reaction product prepared in accordance with Example II.
[2] 1089—Fatty diamine-aldehyde reaction product prepared in accordance with Example I.
[3] Filter disk code: 0—no discoloration; 1—light discoloration but no definite evidence of precipitate; 2—medium brown discoloration but not black, indication of trace of precipitate; 3—black deposit showing definite evidence of insolubles in fuel; 4—black deposit showing considerable precipitate at 5; black deposit showing heavy precipitate.

The results of the 100° F. cabinet storage test of Table II show that although the oxyalkylated product additives of the present invention did not improve color they effectively inhibited the formation of deposits in the fuel oil. For example, comparing the tests on the fuel compositions with the test on the neat fuel, it is seen that the amount of deposit formed in the neat fuel was at the lowest 2.2 milligrams per 100 milliliters, whereas the amount of deposit formed in the novel fuel compositions was at the highest 1.2. In the majority of cases the amount of deposit formed in the additive compositions was below 1.0 milligram per 100 milliliters and as low as 0.4 milligram per 100 milliliters. Visual inspection of the storage tubes after 4 months showed only trace amounts of deposit when using SS 1033 C and none with the other additives as compared to a heavy precipitate in the neat fuel tube. Also shown in Table II is the vention improve the stability of fuels under most of these conditions. It is preferred, however, when using the distillate fuels as diesel fuels, to incorporate in addition to the additives of the present invention minor amounts of a metal deactivator. As shown, the combination of a minor amount of metal deactivator with the additives of the present invention produces an excellent stabilizer for diesel fuels.

EXAMPLE III

A series of oxyalkylated products were prepared having the compositions shown in Table III. The fatty diamine-aldehyde reaction product in all instances was the reaction product of Duomeen T and an aldehyde selected from either paraformaldehyde or 37% formaldehyde solution, in xylene solution while the alkylene oxide and the proportions reacted as well as the reaction temperature and catalyst employed are shown in Table III.

Table III

| No. | Composition | | Oxyalkylated base | | | | Catalyst | | Oxyalkylation temp., °F. |
|---|---|---|---|---|---|---|---|---|---|
| | Percent oxyalkylated base | Percent xylene | Aldehyde-Duomeen T base [1] | | Ethylene oxide, percent | Propylene oxide, percent | Percent | Type | |
| | | | Number | Percent | | | | | |
| SS 795A | 55.8 | 44.2 | SS 794 | 80 | 20 | | 0.8 | Na methylate | 340-360 |
| B | 59.0 | 41.0 | SS 794 | 70 | 30 | | 0.7 | ...do... | 340-360 |
| C | 62.8 | 37.2 | SS 794 | 60 | 40 | | 0.6 | ...do... | 340-360 |
| D | 66.9 | 33.1 | SS 794 | 50 | 50 | | 0.5 | ...do... | 340-360 |
| E | 74.3 | 25.7 | SS 794 | 35 | 65 | | 0.35 | ...do... | 340-360 |
| F | 80.1 | 19.9 | SS 794 | 25 | 75 | | 0.25 | ...do... | 340-360 |
| SS 995A | 53.0 | 47.0 | SS 990 | 80 | 20 | | 0.8 | ...do... | 350-360 |
| B | 56.3 | 43.7 | SS 990 | 70 | 30 | | 0.7 | ...do... | 350-360 |
| C | 64.2 | 35.8 | SS 990 | 50 | 50 | | 0.5 | ...do... | 350-360 |
| D | 74.2 | 25.8 | SS 990 | 31.5 | 68.5 | | 0.315 | ...do... | 350-360 |
| SS 999A | 53.0 | 47.0 | SS 990 | 80 | 20 | | 1.6 | $H_2SO_4$ | 340-360 |
| B | 56.3 | 43.7 | SS 990 | 70 | 30 | | 1.4 | $H_2SO_4$ | 340-360 |
| C | 64.2 | 35.8 | SS 990 | 45 | 55 | | .9 | $H_2SO_4$ | 340-360 |
| D | 71.9 | 28.1 | SS 990 | 35 | 65 | | .7 | $H_2SO_4$ | 340-360 |
| SS 1003A | 56.6 | 43.4 | SS 990 | 80 | 20 | | .8 | Sulfonic acids | 340-360 |
| B | 59.8 | 40.2 | SS 990 | 70 | 30 | | .7 | ...do... | 340-360 |
| C | 67.5 | 32.5 | SS 990 | 50 | 50 | | .5 | ...do... | 340-360 |
| SS 1001A | 64.6 | 35.4 | SS 996 | 75 | 25 | | .75 | Na methylate | 340-360 |
| SS 1005A | 51.7 | 48.3 | SS 1002 | 80 | 20 | | 1.6 | Sulfonic acids | 340-360 |
| B | 56.2 | 43.8 | SS 1002 | 66.8 | 33.2 | | 1.37 | ...do... | 340-360 |
| C | 63.3 | 36.7 | SS 1002 | 50 | 50 | | 1.00 | ...do... | 340-360 |
| SS 1036A | 56.7 | 43.3 | SS 1028 | 80 | | 20 | 1.6 | Na methylate | 355-365 |
| SS 1043A | 58.2 | 41.8 | SS 1042 | 90 | | 10 | 1.58 | ...do... | 300-320 |
| B | 67.2 | 32.8 | SS 1042 | 70 | | 30 | 1.23 | ...do... | 300-320 |
| SS 1093A | 65.0 | 35.0 | SS 1089 | 90 | 8 | 2 | 1.26 | ...do... | 340-350 |
| B | 67.6 | 32.4 | SS 1089 | 80 | 16 | 4 | 1.13 | ...do... | 340-350 |
| C | 70.5 | 29.5 | SS 1089 | 70 | 24 | 6 | .98 | ...do... | 340-350 |

[1] Weight ration diamine to aldehyde: A SS 794 4 to 1; B SS 990 4 to 1; C SS 996 250 to 56; D SS 1002 2001 to 35; E SS 1042 400 to 81.
Aldehyde: A Paraformaldehyde; B Paraformaldehyde; C 37% HCHO solution; D 37% HCHO solution; E 37% HCHO solution.

NOTE.—On series SS 1093 ethylene and propylene oxides were mixed prior to injection into reactor.

Small amounts of the products thus prepared are added to the distillate fuel oil of Example I and tested as in Example I. All of the products shown value as distillate fuel oil stabilizers.

We claim:
1. A fuel oil composition consisting essentially of a distillate fuel oil and a small amount, sufficient to effectively stabilize said oil against deterioration, of an oil-compatible, oxyalkylated condensation product obtained by reacting about 20 to 95 weight percent of the condensation product of a fatty diamine having the structural formula:

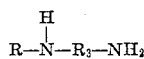

in which R is an aliphatic hydrocarbon chain of at least about 6 carbon atoms and $R_3$ is a divalent aliphatic hydrocarbon radical containing about 2 to 8 carbon atoms and a lower aldehyde of one to four carbon atoms, with about 5 to 80 weight percent of an alkylene oxide of 2 to 4 carbon atoms, said fatty diamine-aldehyde condensation product being prepared by reacting about one mole equivalent of the aldehyde with about 0.5 to 2 moles equivalent of the fatty diamine.

2. The fuel oil composition of claim 1 in which a distillate fuel contains cracked components.

3. The fuel oil composition of claim 1 in which the fatty diamine-aldehyde condensation product is about 50 to 90 weight percent.

4. The fuel oil composition of claim 1 wherein $R_3$ in the structural formula of the fatty diamine is trimethylene and R is the straight chain hydrocarbon residue derived from tallow fatty acids containing 16 to 18 carbon atoms and the alkylene oxide is ethylene oxide.

5. The fuel oil composition of claim 1 wherein the oxyalkylated product is present in an amount ranging from about 5 pounds per thousand barrels of fuel to 250 pounds per thousand barrels of fuel oil.

6. The fuel oil composition of claim 4 wherein the oxyalkylated product is present in amounts of about 5 pounds per thousand barrels of fuel oil to 100 pounds per thousand barrels of fuel oil.

7. A fuel oil composition consisting essentially of a distillate diesel fuel, about 5 to 250 pounds per thousand barrels of said fuel of an oil-compatible oxyalkylated condensation product obtained by reacting about 20 to 95 weight percent of the condensation product of a fatty diamine having the structural formula:

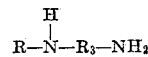

in which R is an aliphatic hydrocarbon chain of at least about 6 carbon atoms and $R_3$ is a divalent aliphatic hydrocarbon radical containing about 2 to 8 carbon atoms and a lower aldehyde of one to four carbon atoms, with about 5 to 80 weight percent of an alkylene oxide of 2 to 4 carbon atoms, and about .25 to 2 pounds per thousand barrels of said fuel of N,N'-disalicylidene 1,2-propylenediamine, said fatty diamine-aldehyde condensation product being prepared by reacting about one mole equivalent of the aldehyde with about 0.5 to 2 moles equivalent of the fatty diamine.

8. A fuel oil composition consisting essentially of a distillate diesel fuel, about 5 to 50 pounds per thousand barrels of said fuel of an oil-compatible oxyalkylated condensation product obtained by reacting about 20 to 95 weight percent of the condensation product of a fatty diamine having the structural formula:

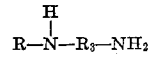

in which $R_3$ is trimethylene and R is a straight chain hydrocarbon residue derived from tallow fatty acids containing 16 to 18 carbon atoms and formaldehyde with about 5 to 20 weight percent of an alkylene oxide of 2 to 4 carbon atoms, and about .5 to 1 pound per thousand barrels of said fuel of N,N'-disalicylidene 1,2-propylenediamine, said fatty diamine-aldehyde condensation product being prepared by reacting about one mole equivalent of the aldehyde with about 0.5 to 2 moles equivalent of the fatty diamine.

9. The fuel oil composition of claim 1 in which the distillate fuel oil is a diesel fuel.

10. The fuel oil composition of claim 1 wherein the aldehyde is formaldehyde.

11. The fuel oil composition of claim 10 wherein the fatty diamine-formaldehyde condensation product is prepared by reacting one mole equivalent of formaldehyde with about 1 mole equivalent of the fatty diamine.

12. A fuel oil composition consisting essentially of a distillate fuel oil and a small amount, sufficient to effectively stabilize said oil against deterioration, of an oil-compatible, oxyalkylated condensation product obtained by reacting about 20 to 95 weight percent of the condensation product of a fatty diamine having the structural formula:

$$R-\underset{\underset{H}{|}}{N}-R_3-NH_2$$

in which $R_3$ is trimethylene and R is the straight-chain hydrocarbon residue derived from tallow fatty acids containing 16 to 18 carbon atoms and formaldehyde, with about 5 to 80 weight percent of ethylene oxide, said fatty diamine-formaldehyde condensation product being prepared by reacting about 1 mole equivalent of formaldehyde with about 0.5 to 2 moles equivalent of a fatty diamine.

13. The fuel oil composition of claim 12 wherein the fatty diamine-formaldehyde condensation product is prepared by reacting about 1 mole equivalent of formaldehyde with about 1 mole equivalent of the fatty diamine.

References Cited in the file of this patent

UNITED STATES PATENTS

| | | |
|---|---|---|
| 2,282,513 | Downing et al. | May 12, 1942 |
| 2,528,360 | Greenlee | Oct. 31, 1950 |
| 2,576,458 | Hill et al. | Nov. 27, 1951 |
| 2,684,893 | Hughes et al. | July 27, 1954 |
| 2701,187 | Andress | Feb. 1, 1955 |

FOREIGN PATENTS

| | | |
|---|---|---|
| 793,448 | Great Britain | Apr. 16, 1958 |